(12) United States Patent
Pilon et al.

(10) Patent No.: US 11,892,698 B2
(45) Date of Patent: Feb. 6, 2024

(54) OPTIC FIBER CABLE GUIDE ASSEMBLY

(71) Applicant: BELDEN CANADA ULC, Saint-Laurent (CA)

(72) Inventors: Vincent Pilon, Lachine (CA); Olivier Kedzierski, Verdun (CA)

(73) Assignee: BELDEN CANADA ULC, Saint-Laurent (CA)

( * ) Notice: Subject to any disclaimer, the term of this patent is extended or adjusted under 35 U.S.C. 154(b) by 0 days.

(21) Appl. No.: 18/060,866

(22) Filed: Dec. 1, 2022

(65) Prior Publication Data
US 2023/0134513 A1 May 4, 2023

Related U.S. Application Data

(63) Continuation of application No. 17/120,617, filed on Dec. 14, 2020, now Pat. No. 11,543,610, which is a continuation of application No. 16/546,492, filed on Aug. 21, 2019, now Pat. No. 10,866,379.

(60) Provisional application No. 62/722,556, filed on Aug. 24, 2018.

(51) Int. Cl.
*G02B 6/44* (2006.01)

(52) U.S. Cl.
CPC ......... *G02B 6/4452* (2013.01); *G02B 6/4453* (2013.01)

(58) Field of Classification Search
CPC ....... G02B 6/44; G02B 6/4452; G02B 6/4453
See application file for complete search history.

(56) References Cited

U.S. PATENT DOCUMENTS

| 5,836,148 | A | 11/1998 | Fukao |
| 6,327,139 | B1 | 12/2001 | Champion et al. |
| 6,437,243 | B1 | 8/2002 | VanderVelde et al. |
| 9,913,397 | B2 | 3/2018 | Miwa |
| 10,292,299 | B2 | 5/2019 | Adrian |
| 10,598,884 | B2 | 3/2020 | Fontaine et al. |
| 10,627,591 | B2 | 4/2020 | Geling et al. |
| 10,732,373 | B2 | 8/2020 | Geens et al. |
| 10,866,379 | B2 * | 12/2020 | Pilon .................. G02B 6/44526 |
| 11,543,610 | B2 * | 1/2023 | Pilon .................... G02B 6/4453 |
| 2002/0181922 | A1 * | 12/2002 | Xin ....................... G02B 6/3897 385/135 |
| 2006/0018622 | A1 | 1/2006 | Caveney et al. |
| 2008/0131070 | A1 | 6/2008 | Zellak et al. |
| 2014/0248028 | A1 | 9/2014 | Campbell et al. |
| 2015/0370027 | A1 * | 12/2015 | Geens .................. G02B 6/4478 385/135 |

(Continued)

*Primary Examiner* — Tina M Wong
(74) *Attorney, Agent, or Firm* — LAVERY, DE BILLY, LLP; Hugh Mansfield

(57) ABSTRACT

An assembly for guiding an optic fiber cable comprising a tray configured to move between a first position and a second position and a guide. A first end portion of the guide is configured to move relative to the tray during operation and a second end portion is configured to move with the tray during operation. The guide comprises a bend limiting passage configured to follow a curve shape having a radius that is greater than a predetermined minimum bend radius and such that an optic fiber that is received between the first end portion of the guide and the second end portion of the guide follows the curve shape so as to prevent the optic fiber from becoming snagged on the tray, hindering movement of the tray or becoming overly bent during operation of the assembly.

19 Claims, 7 Drawing Sheets

(56) References Cited

U.S. PATENT DOCUMENTS

2016/0215901 A1    7/2016   Takeuchi et al.
2020/0064576 A1    2/2020   Pilon et al.

\* cited by examiner

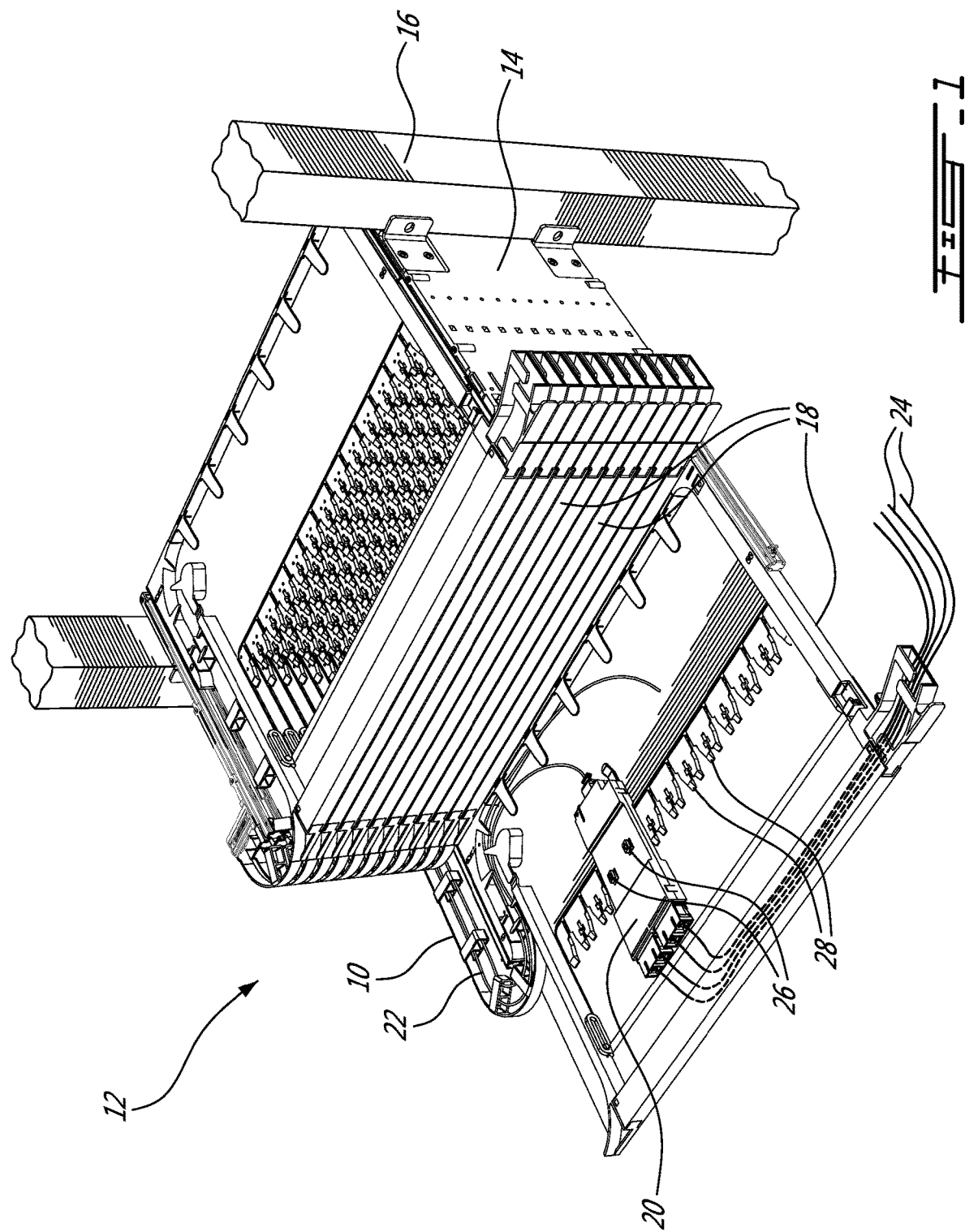

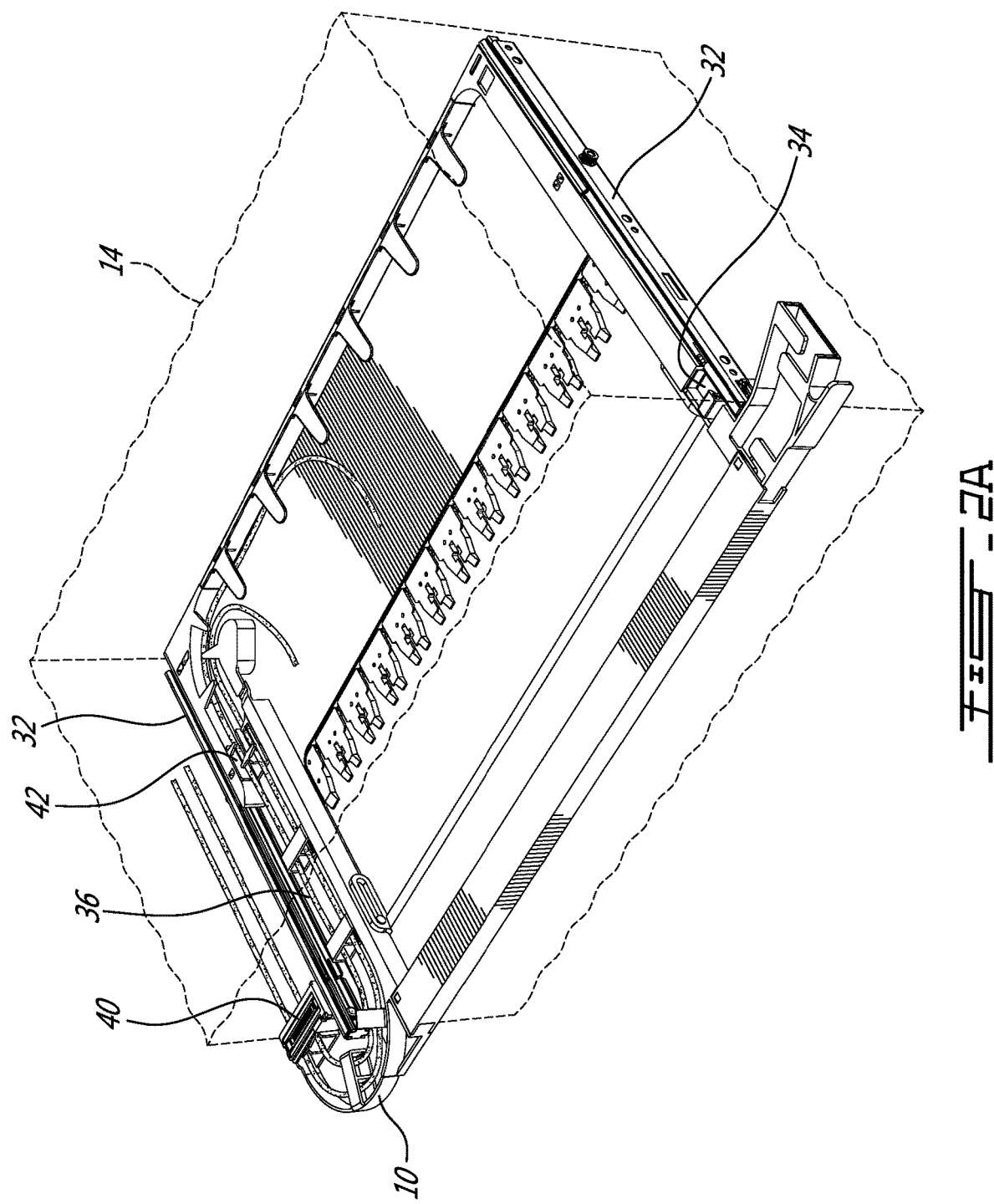

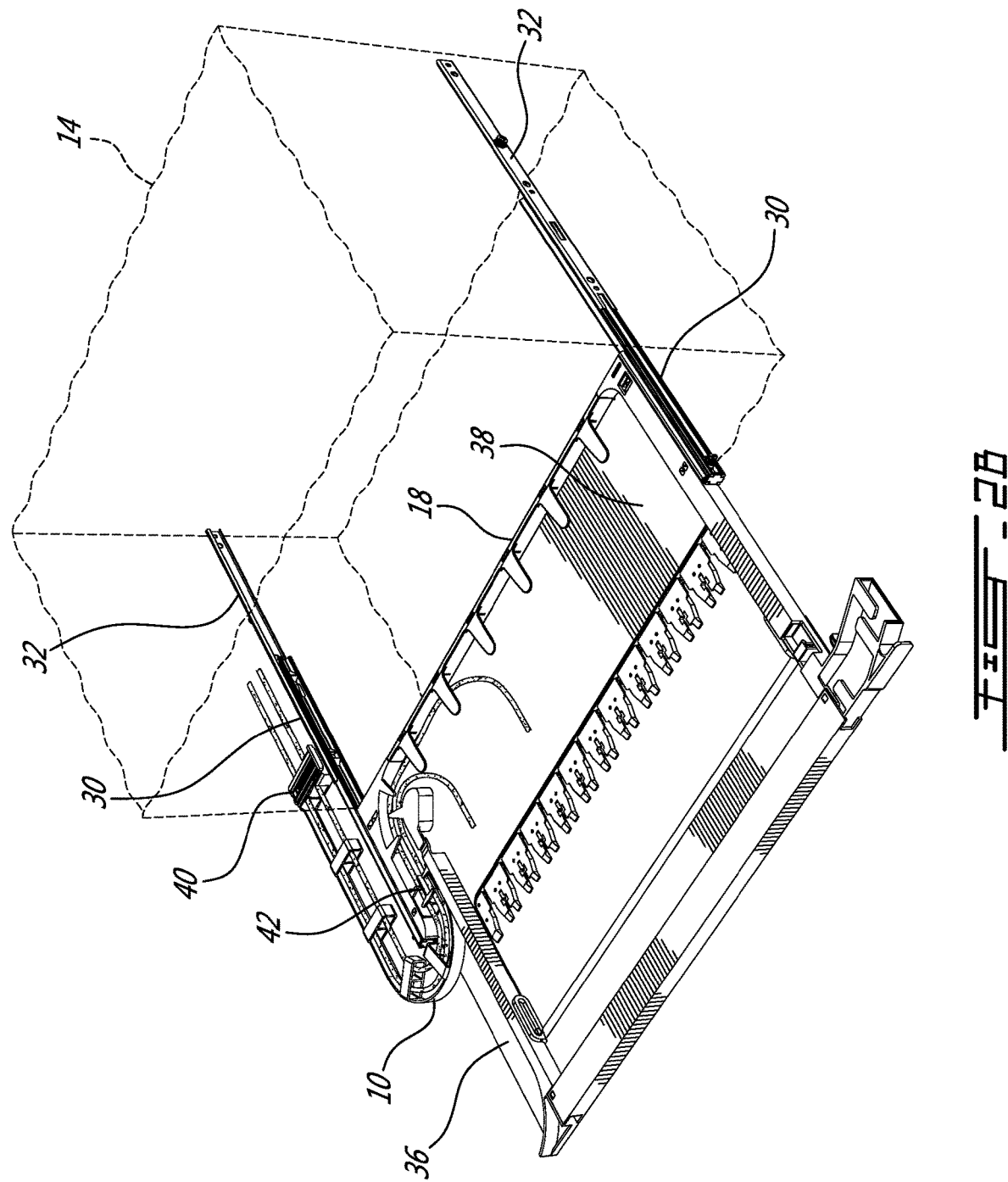

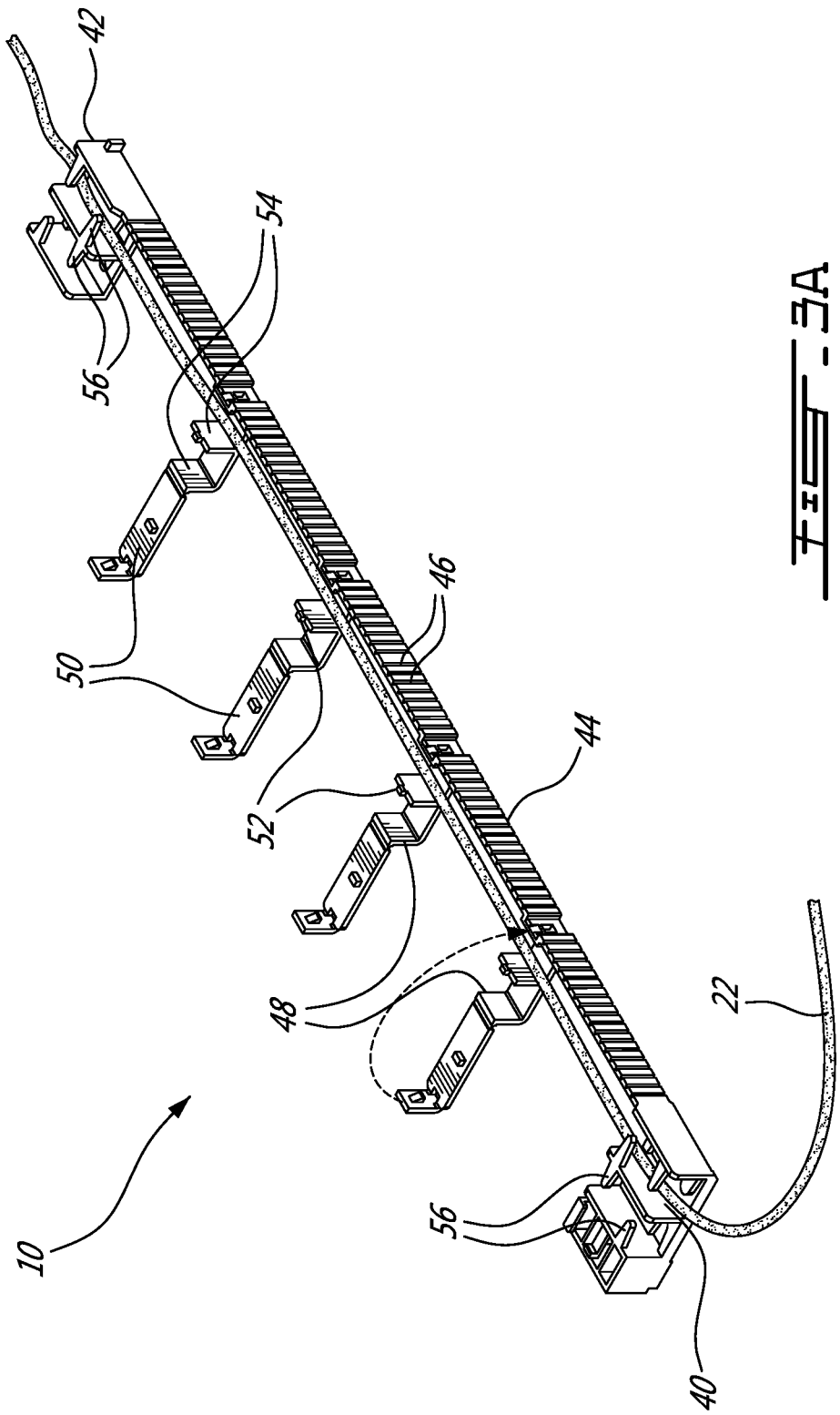

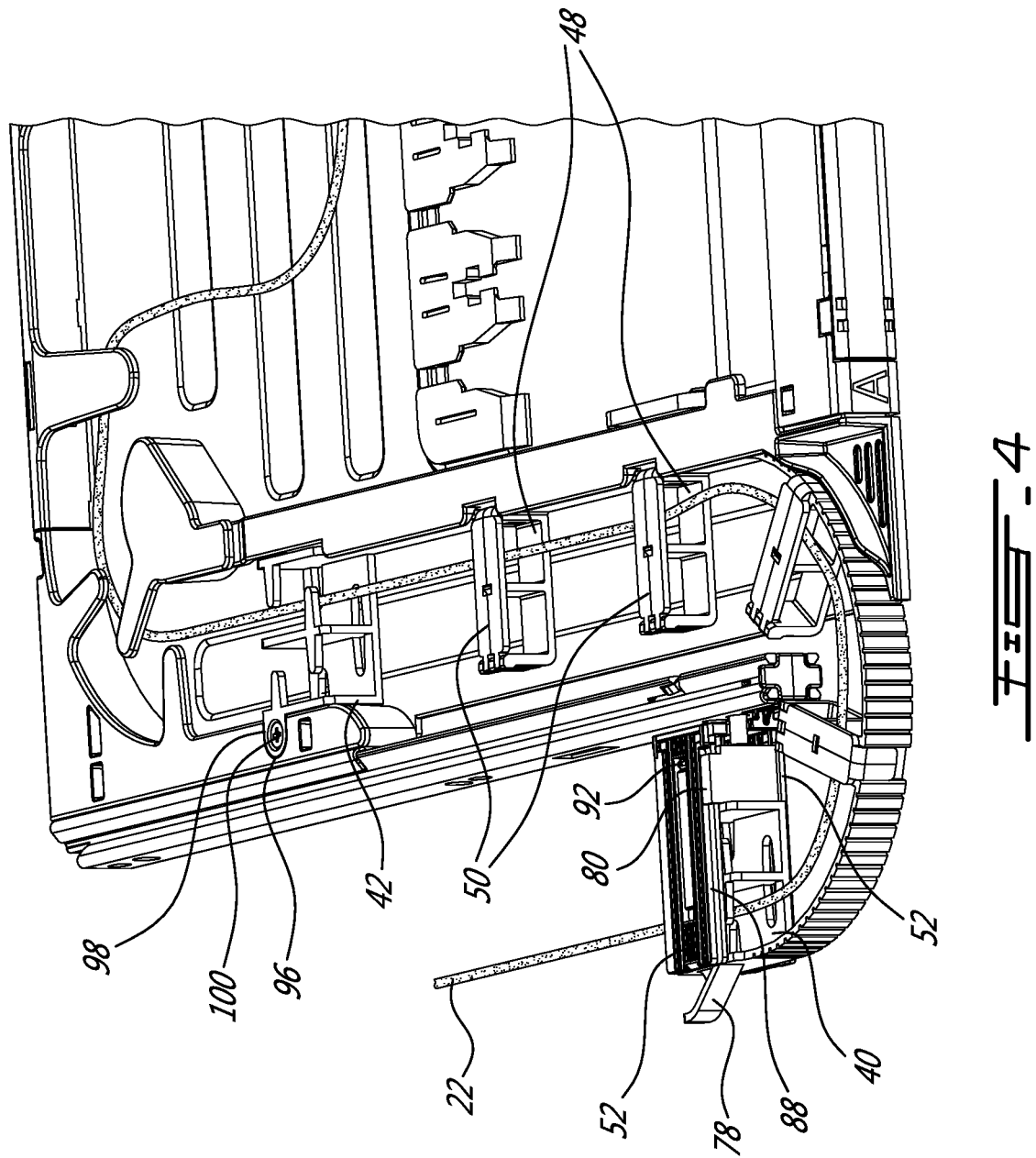

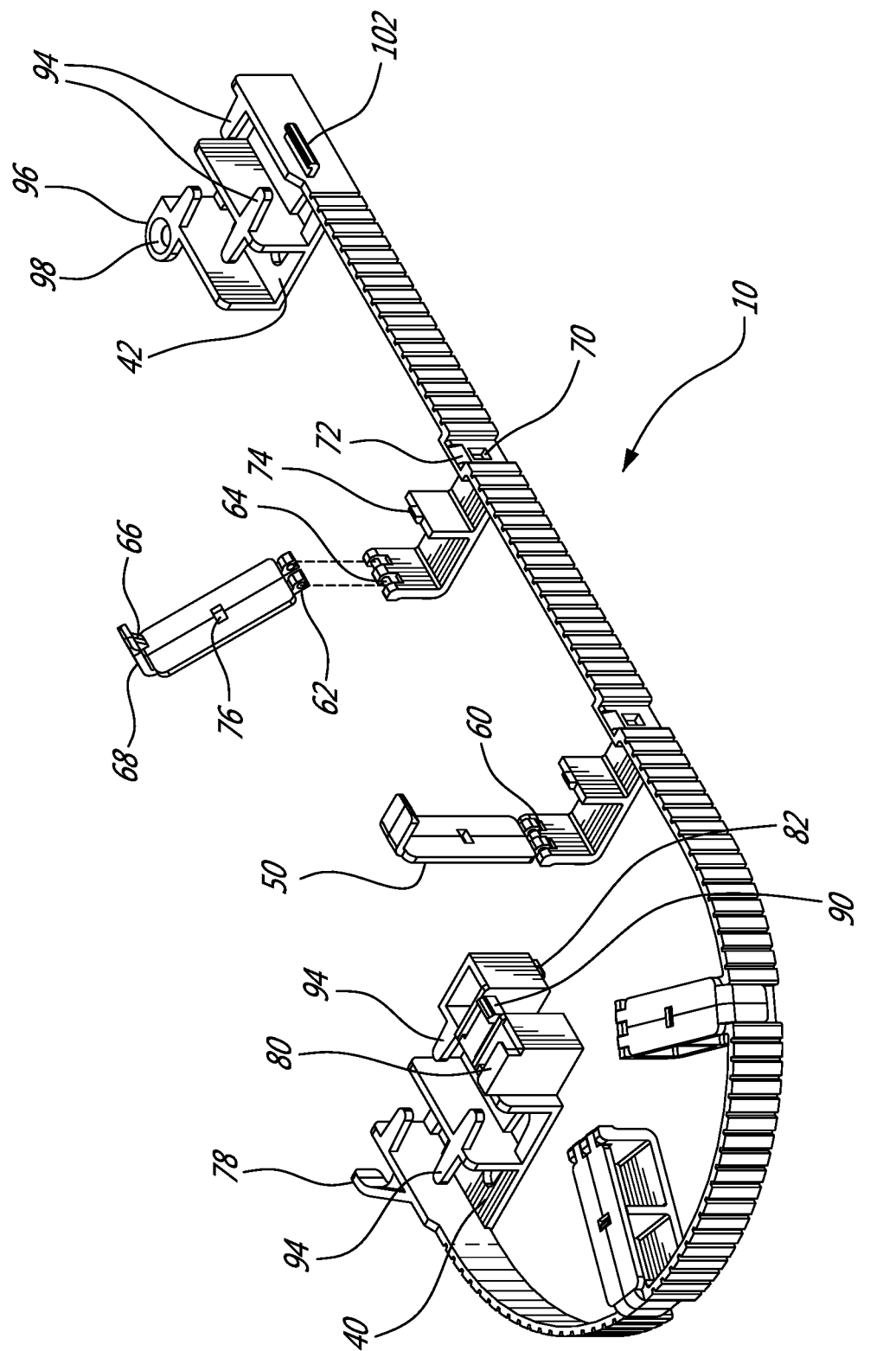

OPTIC FIBER CABLE GUIDE ASSEMBLY

CROSS REFERENCE TO RELATED APPLICATIONS

This application is a continuation application of U.S. patent application Ser. No. 17/120,617 filed on Dec. 14, 2020 which is a continuation application of U.S. patent application Ser. No. 16/546,492 filed on Aug. 21, 2019, now U.S. Pat. No. 10,866,379, which claims benefit, under 35 U.S.C. § 119(e) of U.S. provisional application Ser. No. 62/722,556 filed on Aug. 24, 2018 and which is incorporated herein in its entirety by reference.

FIELD OF THE INVENTION

The present invention relates to an optic fiber cable guide assembly. In particular, the present invention relates to an assembly comprising a cable guide that guides a fibre optic cable to a device mounted on a moveable tray.

BACKGROUND TO THE INVENTION

Enclosures which house fiber optic equipment such as cross-connects or the like terminate a large number of fiber optic cables. Additionally, in many installations given limited space, enclosures are only easily accessible via the front of the enclosure for servicing or modifying connections or the like which requires that fiber optic cables both enter and exit the enclosure via the front. In order to provide ease of access to modules held within the enclosures, especially to the rear and without the necessity of removing the modules, slideable trays are provided which can be pulled forward to allow access to the modules. One drawback of such designs is that fiber optic cables entering the front of the enclosure become snagged on the trays which can lead to them being damaged or broken, or hindering the movement of the tray.

SUMMARY OF THE INVENTION

In order to address the above and other drawbacks there is provided a fiber optic cross connect system for interconnecting a first external equipment with a second external equipment. The system comprises an enclosure comprising a top, a bottom, a first side and a second side defining a tray receiving space therebetween, a slideable tray arranged horizontally and moveable between a stored position wherein the tray is within the tray receiving space and an extended position wherein the tray is substantially in front of the tray receiving space, an elongate fiber optic terminating equipment arranged on the tray for movement therewith and comprising a first interface arranged along a rearward edge and a second interface arranged along a forward edge, a first plurality of fiber optic cables each comprising a first end terminated at the first interface and a second end for termination at the first external equipment, a second plurality of fiber optic cables each comprising a first end terminated at the second interface and a second end for termination at the second external equipment, a flexible cable guide for guiding the first plurality of fiber optic cables and comprising a first end attached to an outside of the first side of the enclosure and defining an entrance, a second end attached to the tray adjacent the first side and an intermediate section between the first end and the second end comprising a plurality of spaced cable retainers interconnected by a elongate flexible side band, each of the cable retainers defining a cable passage wherein the plurality of cable passages together define a cable passageway arranged along the side band, the intermediate section comprising a curve delimited by the side band, the first end and the second end defining an access to the cable passageway in a direction the cable tray is extendable.

There is also provided a flexible cable guide for guiding a plurality of fiber optic cables from outside of an enclosure, the enclosure comprising a top, a bottom, a first side and a second side defining a tray receiving space therebetween, to inside the enclosure for termination at a network equipment on a tray, the tray slideable horizontally between a stored position wherein the tray is within the tray receiving space and an extended position wherein the tray is substantially in front of the tray receiving space. The guide comprises a first end for attachment to an outside of the first side of the enclosure and defining an entrance, a second end for attachment to the tray adjacent the first side, and an intermediate section between the first end and the second end comprising a plurality of spaced cable retainers interconnected by an elongate flexible side band, each of the cable retainers defining a cable passage wherein the plurality of cable passages together define a cable passageway arranged along the side band. When the first end is attached to the enclosure and the second end is attached to the tray, the intermediate section maintains a constant curve during sliding of the tray, the side band delimits an outside of the constant curve and both the first end and the second end define an access to the cable passage in a direction of extending the cable tray.

BRIEF DESCRIPTION OF THE DRAWINGS

FIG. 1 provides a raised right front perspective view of a fiber optic cross connect system comprising a flexible cable guide in accordance with an illustrative embodiment of the present invention;

FIG. 2A provides a raised right front perspective view of a tray of fiber optic cross connect system comprising a flexible cable guide in a stored position and in accordance with an illustrative embodiment of the present invention;

FIG. 2B provides a raised right front perspective view of a tray of fiber optic cross connect system comprising a flexible cable guide in an extended position and in accordance with an illustrative embodiment of the present invention;

FIG. 3A provides a raised right front perspective view of a flexible cable guide in accordance with an illustrative embodiment of the present invention;

FIG. 4 provides a partial raised left front perspective sectional view of a fiber optic cross connect system comprising a flexible cable guide in accordance with an alternative illustrative embodiment of the present invention; and FIG. 5 provides a raised right front perspective view of a flexible cable guide in accordance with an alternative illustrative embodiment of the present invention.

DETAILED DESCRIPTION OF THE ILLUSTRATIVE EMBODIMENTS

Figure 3B:
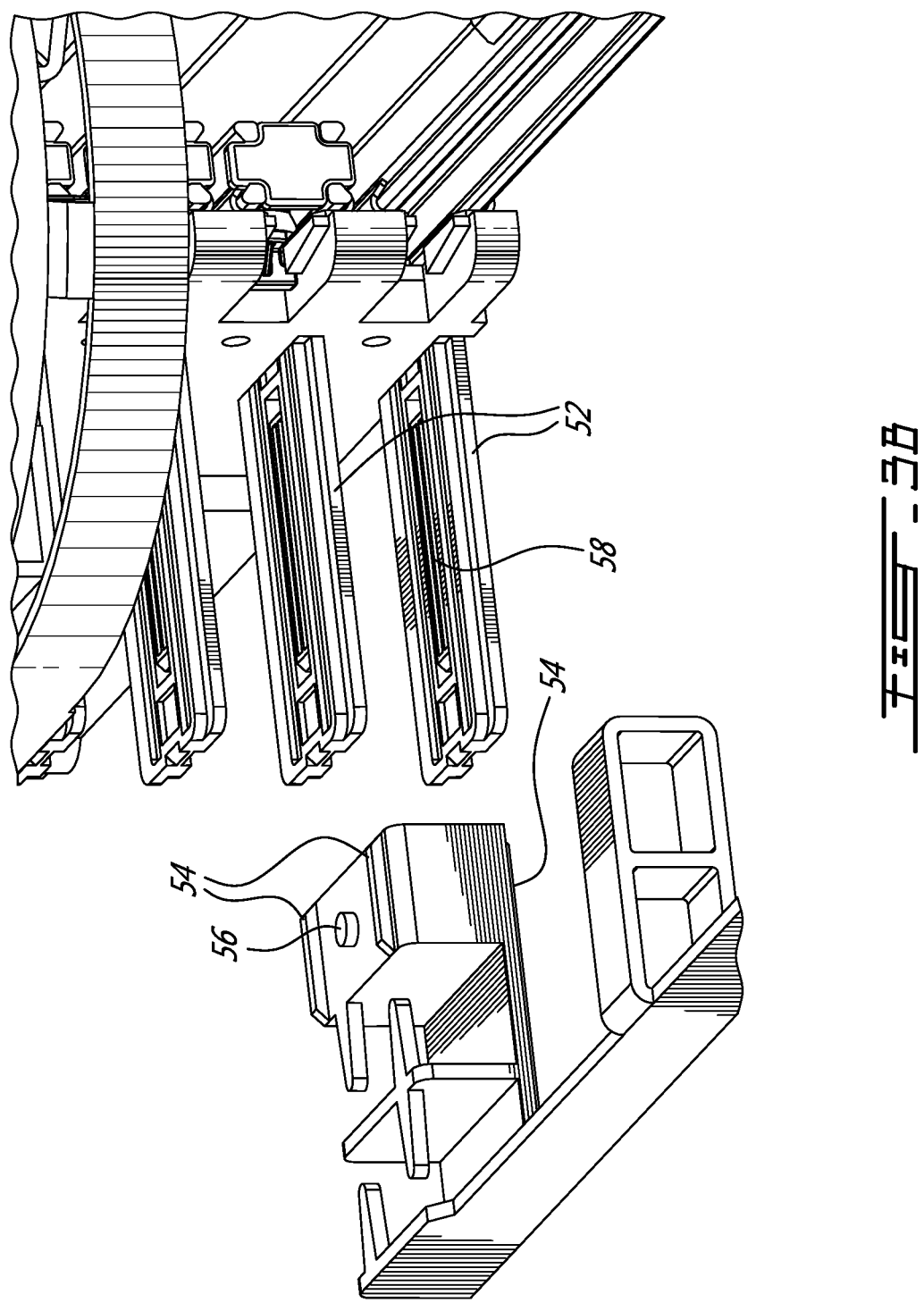
FIG. 3B provides a raised left perspective view of an end of a flexible cable guide and mounting plates in accordance with illustrative embodiment of the present invention.

Referring now to FIG. 1, a flexible cable guide, generally referred to using the reference numeral 10, will be described. The flexible cable guide 10 is illustratively foreseen for use in a cross connect system 12. The cross connect system 12 illustratively comprises an enclosure 14 dimensioned for mounting on a 19" rack 16 or the like. The enclosure 14 comprises a top, bottom, first side and second side and defines a tray receiving space which houses one or more trays 18 which are arranged horizontally and slideably mounted and moveable between a stored position where the tray 18 is within the enclosure 14 and an extended position where the tray 18 is positioned in front of the enclosure 14 and accessible, for example by a technician or the like.

Still referring to FIG. 1, elongate fiber optic terminating equipment 20 such as fiber optic cassettes are illustratively arranged on the tray 18 for movement therewith. The terminating equipment 20 comprises a first interface terminating one or more of a first plurality of fiber optic cables 22 and a second interface for terminating one or more of a second plurality of fiber optic cables 24 and illustratively such that the first plurality of fiber optic cables 22 and the second plurality of fiber optic cables 24 are interconnected. Such cassettes 20 are removably mounted in trays 18 for example through the provision of tabs 26 which engage with tab receiving mounts 28 in the tray 18.

Referring now to FIGS. 2A and 2B, as discussed above each of the trays 18 is moveable on runners 30, which run in complementary channels 32 attached to an inner surface of the enclosure 14, between a stored position (FIG. 2A) and an extended position (FIG. 2B). A lever 34 is provided to release a latch (not shown) which holds the tray 18 in the stored position. The first plurality of fiber optic cables 22 are held in a cable way 36 which provides side access to the rear 38 of the tray 18. The flexible cable guide 10 is placed in the cable way 36 and removably secured at a first end 40 to an outside of the enclosure 14 and at a second end 42 to the tray 18 for movement therewith.

Referring now to FIG. 3A, in a first embodiment the flexible cable guide 10 is illustratively manufactured in one piece from a pliable material such as a flexible plastic or rubber or the like. The flexible cable guide 10 comprises an elongate ribbon-like side band 44 which illustratively comprises a series of transverse notches 46 spaced regularly along a length thereof, thereby improving flexibility. A plurality of cable retainers 48 are spaced along the side band 44. The retainers 48 each comprise a recloseable cover 50 allowing one or more fiber optic cables 22 to be secured using the cable guide 10, or removed. A divider 52 is provided separating each retainer 48 into two (2) cable passages 54 when closed. The first end 40 and the second end 42 each comprise a plurality of flexible fingers 56 which serve to retain the cables 22 within the cable guide 10 while allowing them to be removed as necessary. Together the retainers 48 and their respective cable passages 54 define a cable passageway arranged generally along the side band 44.

Referring back to FIG. 1 and FIG. 2B in addition to FIG. 3A, the first end 40 of the cable guide 10 is secured to the outside of the enclosure 14 at a point proximate to where the first plurality of fiber optic cables 22 will enter the enclosure 14. The second end 42 is secured to the tray 18 for movement therewith. An intermediate portion of the cable guide 10 is flexible and curved and such that the side band 44 delimits an outside of the curve. A person of ordinary skill in the art will now understand that as the tray 18 is moved between the stored position and the extended position the location of the curve within the intermediate section of the side band 44 will change in order to accommodate the movement of the tray 18. In this manner movement of the first plurality of fiber optic cables 22 is limited and such that they are not subject to excess strain and the like. Additionally, the first plurality of fiber optic cables 22 of one tray 18 are prevented from fouling or otherwise impeding the movement of the other trays 18.

Still referring to FIG. 1 and FIG. 2B in addition to FIG. 3A, during installation of the first plurality of fiber cables 22 the tray 18 is first placed in the extended position and the covers 50 opened. One or more fiber optic cables 22 are placed within selected one of the passages 54 and interconnected with respective ones of the cassettes 20. The covers 50 may then be closed the tray 18 placed in stored position of FIG. 2A. If fiber optic cables 22 must be removed or additional cables 22 added, the tray 18 is simply placed again in the extended position and the covers 50 opened.

Referring now to FIG. 3B in addition to FIG. 3A, in order to removably secure the first end 40 to an outside of the enclosure 14 a plurality of horizontally extending mounting plates 52 are provided. The mounting plates 52 are arranged in vertical alignment and equally spaced such that the first ends 40 of each of the flexible cable guides 10 may be slid horizontally between successive ones of the mounting plates 52. The ends 40 are retained in place through the combination of pairs of opposed raised guides 54 and pairs of flexible bosses 56 which are held within channels 58 moulded or otherwise formed within the mounting plate 52. In this manner the first end 40 can be released and re-secured such that additional optical fibers (not shown) can be mounted within the cable guide 10.

Referring now to FIGS. 4 and 5, in an alternative embodiment the covers 50 which provide access to the cable retainers 48 are removeable and fabricated from a relatively rigid material such as plastic or the like. Each cover 50 is secured to its respective cable retainers 48 at a proximate end via a hinge assembly 60 comprising a pair of clips 62 which receive a shaft 64 and about which the cover 50 can rotate. Each cover 50 can be opened thereby allowing one or more fiber optic cables 22 to be retained by or removed from the cable guide 10. Each cover 50 may be subsequently be closed and retained in place by a tab 66 formed on an inside of a distal end 68 of each cover 50 and which engages a respective one of a plurality of tab receiving cut outs 70 moulded in the side band 44. A bevelled surface 72 is provided adjacent each cut out 70 to ease closing. When closed, a middle portion of each cover 50 is stabilised by a boss 74 which engages a slot 76 in the cover 50. Covers 50 of different trays 18 can be colour coded to improve cable management and the like.

Still referring to FIGS. 4 and 5, in an alternative embodiment the cable guide 10 further comprises a pull tab 78 at the first end 40 to aid in removing the first end 40 from between the mounting plates 52. In order to ease reinsertion of the first end 40 between the mounting plates 52 an upper guide 80 and a lower guide 82 are provided which engage an outer edge 88 of respectively an upper mounting plate 52 and a lower mounting plate 52. The first end 40 is held between the mounting plates 52 by a flexible clip 90 which engages a cut out 92 in an upper one of the mounting plates 52.

Still referring to FIGS. 4 and 5, in an alternative embodiment a plurality of flexible fingers 94 are provided at both ends of the cable guide 10 to removeable retain the one or more fiber optic cables 22 there between. Additionally, the second end 42 comprises a flange 96 comprising a conical aperture 98 for receiving a screw 100 or the like for securing the second 42 to the tray 18. The screw 100 works together with a ridge 102 which engages an aperture (not shown) in the tray 18 in order to retain the second end 42 securely for movement with the tray 18.

Although the present invention has been described hereinabove by way of specific embodiments thereof, it can be modified, without departing from the spirit and nature of the subject invention as defined in the appended claims.

The invention claimed is:

1. An optic fiber cable guide assembly comprising:
   an enclosure;
   a tray;
   a cable guide comprising a first end, a second end, a flexible band between the first end and the second end, and a cable retainer;
   a device;
   wherein the tray is configured to slide between a first position where the tray is within the enclosure and a second position where the tray is at least partially in front of the enclosure;
   wherein the first end is configured to be immoveable with respect to the enclosure;
   wherein the second end is configured to be moved with the tray;
   wherein the retainer is configured to define a passage between the first end and the second end along the flexible band;
   wherein the flexible band comprises a surface that is configured to extend along a right angle relative to at least a portion of the passage;
   wherein at least a first portion of the passage is configured to extend along a first direction adjacent the first end of the cable guides that is opposite and substantially parallel to a second direction of at least second portion of the passage that is located adjacent to the second end of the cable guide;
   wherein the cable retainer is configured to receive at least a portion of an optic fiber cable along the passage; and
   wherein when the tray is slid between the first position and the second position, at least a portion of the passage is configured to follow a curve of about 180 degrees and have a constant radius, and at least a portion of the optic fiber cable between the first end and the second end is configured to follow the curve so as to prevent the optic fiber cable from becoming snagged on the tray, hindering movement of the tray or becoming overly bent.

2. The optic fiber cable guide assembly of claim 1, wherein the retainer comprises a plurality of retainers spaced along the flexible band.

3. The optic fiber cable guide assembly of claim 1, wherein the enclosure is configured to be mounted to a 19" rack.

4. The optic fiber cable guide assembly of claim 1, further comprising a plurality of trays, a plurality of cable guides, and a plurality of devices, wherein each of the plurality of trays is configured to independently slide between the first position and the second position, wherein the second end of each of the plurality of cable guides is configured to be moved with a connected one of the plurality of trays, and wherein each of the cable retainers is configured to receive at least one optic fiber that is configured to be terminated with at least one of the plurality of devices that are configured to be mounted on the connected one of the plurality of trays.

5. An assembly for guiding an optic fiber cable that may be terminated at a device comprising:
   a tray;
   a cable guide comprising a first end portion, a second end portion, an intermediate portion between the first end portion and the second end portion, and a retaining portion;
   wherein the tray is configured to slide between a first position and a second position;
   wherein the first end portion is configured to move relative to the tray during operation of the assembly;
   wherein the second end portion is configured to move with the tray during operation of the assembly;
   wherein the tray is configured to receive a device;
   wherein the retaining portion is configured to define a passage between the first end portion and the second end portion along the intermediate portion;
   wherein at least a first portion of the passage that is located adjacent to the first end portion of the cable guide extends along a first direction that is opposite to and substantially parallel with a second direction of at least a second portion of the passage that is located adjacent to the second end portion of the cable guide;
   wherein the retaining portion is configured to receive at least a portion of an optic fiber cable along a receiving portion of the passage;
   wherein when the tray is slid between the first position and the second position, a first curved passage portion of the passage is configured to follow a curve of 180 degrees and have a substantially constant radius, and a curved fiber portion of the optic fiber cable that is located between the first end portion and the second end portion of the cable guide is configured to follow the curved passage portion so as to prevent the curved fiber portion of optic fiber cable from becoming snagged on the tray, hindering movement of the tray or becoming overly bent during operation of the assembly.

6. The assembly for guiding an optic fiber cable that may be terminated at a device of claim 5, wherein the retaining portion comprises a plurality of retaining portions spaced along the intermediate portion.

7. The assembly for guiding an optic fiber cable that may be terminated at a device of claim 5, wherein the intermediate portion is elongate and comprises a substantially flat portion and a surface portion that extends at a right angle relative to the passage.

8. The assembly for guiding an optic fiber cable that may be terminated at a device of claim 6, wherein the substantially flat elongate intermediate portion comprises a plurality of transverse notches spaced regularly along a length thereof.

9. The assembly for guiding an optic fiber cable that may be terminated at a device of claim 5, wherein the retainer portion comprises a cover that is configured to provide access to the passage.

10. The assembly for guiding an optic fiber cable that may be terminated at a device of claim 5, wherein the retainer portion comprises a plurality of retaining structures that are evenly spaced along the intermediate portion.

11. The assembly for guiding an optic fiber cable that may be terminated at a device of claim 9, wherein the cover is configured to be hingedly mounted to a cable retainer.

12. The assembly for guiding an optic fiber cable that may be terminated at a device of claim 5, wherein the tray is configured to be slidingly mounted in an enclosure and wherein the first end portion of the cable guide is configured to be attached to a side portion of the enclosure.

13. The assembly for guiding an optic fiber cable that may be terminated at a device of claim 12, wherein the first end portion of the cable guide is configured to be selectively detached from the side portion of the enclosure.

14. An assembly for guiding an optic fiber cable comprising:
   a tray configured to move between a first position and a second position; and a guide member comprising a first end portion, a second end portion, and an intermediate portion located between the first end portion and the second end portion;

wherein the first end portion is configured to move relative to the tray during operation of the assembly;

wherein the second end portion is configured to move with the tray during operation of the assembly;

wherein the guide member comprises a passage that is located between the first end portion and the second end portion along the intermediate portion;

wherein when the tray moves between the first position and the second position, a bend limiting passage portion of the passage is configured to follow a curve shape having a curve radius that is greater than a predetermined optical fiber minimum bend radius such that an optic fiber portion of an optic fiber that is received between the first end portion of the guide member and the second end portion of the guide member is configured to follow the curve shape so as to prevent the optic fiber portion of the optic fiber cable from becoming snagged on the tray, hindering movement of the tray or becoming overly bent during operation of the assembly.

15. The assembly for guiding an optic fiber cable of claim 14, wherein the curve shape comprises a substantially 180 degree curve shape.

16. The assembly for guiding an optic fiber cable of claim 14, wherein the curve radius comprises a constant curve radius.

17. The assembly for guiding an optic fiber cable of claim 14, wherein the passage includes a first portion that is located adjacent to the first end portion of the guide member and extends along a first direction that is opposite to and substantially parallel with a second direction of a second portion of the passage that is located adjacent to the second end portion of the guide member.

18. The assembly for guiding an optic fiber cable of claim 14, wherein the guide member comprises a cable retainer portion between the first end portion and the second end portion, and wherein the cable retainer portion is configured to receive at least a portion the optic fiber cable during operation of the assembly.

19. The assembly for guiding an optic fiber cable of claim 18, wherein the cable retainer portion comprises a plurality of cable retainers spaced along the intermediate portion of the guide member, wherein the plurality of cable retainers together define the portion of the passage that extends between the first end portion and the second end portion, and wherein each of the plurality of cable retainers are configured to receive at least a portion the optic fiber cable during operation of the assembly.

* * * * *